United States Patent

[11] 3,631,602

[72] Inventor Monroe L. Noel
 2624 S.W. 33, Oklahoma City, Okla. 73102
[21] Appl. No. 860,739
[22] Filed Sept. 24, 1969
[45] Patented Jan. 4, 1972

[54] APPARATUS FOR INDICATING THE FACE ALIGNMENT OF GOLF CLUBS
3 Claims, 4 Drawing Figs.

[52] U.S. Cl............................................. 33/174 F
[51] Int. Cl.............................................. G01b 5/24
[50] Field of Search................................. 33/174 F, 195, 165, 1 N

[56] References Cited
UNITED STATES PATENTS

| | | | |
|---|---|---|---|
| 616,256 | 12/1898 | Platt | 33/195 |
| 1,335,004 | 3/1920 | Lehigh | 33/165 A |
| 2,546,426 | 3/1951 | Bryant | 33/174 F |

Primary Examiner—Leonard Forman
Assistant Examiner—Dennis A. Dearing
Attorney—Dunlap, Laney, Hessin & Dougherty ABSTRACT: The present invention relates to apparatus for indicating the face alignment of golf clubs. The apparatus comprises an elongated base having means for contacting the face of a golf club head when the head is seated on the base pivotally attached thereto. An indicator arm is attached to the means for contacting the face of the golf club and an upstanding shaft guide member is attached to the other end of the base. An indicator scale is attached to the base and positioned with respect to the indicator arm so that when a wood type of golf club is held in the normal manner for addressing a golf ball with the shaft thereof adjacent to the guide member and the head thereof seated on the base in contact with the means for contacting the face thereof, the relative alignment of the face with the shaft is indicated. The apparatus may be used with iron-type golf clubs to indicate the face alignment thereof when held in the normal manner for striking a golf ball.

PATENTED JAN 4 1972

3,631,602

INVENTOR
MONROE L. NOEL

BY
Dunlap, Henry, Kessin & Dougherty
ATTORNEYS

APPARATUS FOR INDICATING THE FACE ALIGNMENT OF GOLF CLUBS

BACKGROUND OF THE INVENTION

1. Field of the Invention

The present invention relates generally to apparatus for indicating the face alignment of golf clubs, and more particularly but not by way of limitation, to apparatus for quickly indicating the relative alignment of the face of a golf club with respect to a line perpendicular to the intended line of flight of a golf ball when the club is held in the normal manner for addressing a golf ball.

2. Description of the Prior Art

Many various devices have been developed for perfecting the stroke of golfers, instructing golfers in difficult fundamentals, indicating the direction of golf ball will travel when struck and the like. However, apparatus for quickly and easily indicating the relative alignment of the face of wood-type golf clubs with respect to a vertical plane passing through the shafts thereof, or the face alignment of iron-type golf clubs with respect to a line perpendicular to the desired golf ball line of flight, when such clubs are held in the normal position for addressing a golf ball have not been available.

Many machines and devices have been developed and are available for aligning the face of a golf club with the shaft thereof during the manufacture or repair of the golf club. These devices must necessarily achieve a high degree of accuracy, and consequently, are generally highly complicated and difficult to operate. While these machines are commonly used in the manufacture of golf clubs, the design of golf clubs available to the public varies greatly depending upon the particular manufacturer thereof. As a result, the relative alignment of the face of a wood type of golf club of a particular manufacturer with the shaft thereof may vary appreciably as compared to a wood of another manufacturer. Furthermore, iron-type golf clubs commonly include grips having alignment guide surfaces thereon. The face alignment of such irons with respect to a line perpendicular to the desired golf ball line of flight may vary appreciably when held by a particular individual, depending on the individual's grip, etc.

The applicant has observed that the face alignment of wood-type golf clubs available to the public varies as much as 12°. That is, the face alignment of a particular type of wood may be as much as 6° closed with respect to the shaft thereof while another type of wood may be as much as 6° open with respect to the shaft thereof. When a golf ball is struck correctly with a club having a closed face, the flight of the ball will curve to the left, or hook, and if the ball is struck correctly with a golf club having an open face, the flight of the ball will curve to the right, or slice.

Due to the particular physical characteristics of a person swinging a golf club, he may naturally swing the club in an arc which causes the club head to travel on a line as the ball is struck which deviates from the intended line of flight of the ball. If the club head travels on a line extending from the inside of the ball to the outside of the ball as it is struck, the ball will hook. On the other hand, if the line of travel of the club head extends from outside the ball to inside the ball as it is struck, a slice will result. However, if a golfer who naturally swings a golf club from inside the ball to outside the ball as it is struck uses a club, the face of which is opened with respect to the shaft or grip thereof a proper amount, the tendency of the ball to hook will be offset and the ball will travel along the intended line of flight. Conversely, a person who naturally swings from outside the ball to inside the ball may use a club having the face thereof closed with respect to the shaft or grip to achieve the intended line of flight. Thus, in selecting a set of golf clubs for a particular individual, the individual's natural swing should be considered, and a set of golf clubs selected having the particular face alignment required.

In assisting an individual in buying a set of golf clubs, a professional golfer or golf club sales representative may readily determine the type of natural swing the individual has by observing his swing and the line of flight of golf balls struck by the individual. Heretofore, however, the professional golfer or sales representative has had no convenient method of checking the particular face alignment of a set of clubs in order to insure that the individual purchases clubs having a face alignment compatible with his swing.

The present invention provides apparatus for indicating the face alignment of golf clubs which may be used by professional golfers or golf club sales representatives in selecting a set of clubs for an individual, or by the individual himself, to quickly and easily determine the relative face alignment of golf clubs of various manufacturers.

SUMMARY OF THE INVENTION

The present invention relates to apparatus for indicating the face alignment of golf clubs which comprises an elongated base having a flat surface and having an upstanding post at one end thereof, means for contacting the face of a golf club head when the head is seated on the flat surface of the base pivotally attached to the post, an indicator arm attached to the means for contacting the face of the club, and a graduated indicator scale attached to the base and positioned with respect to the indicator arm so that the relative alignment of the face of the club with the centerline of the base is indicated when the golf club is held in the normal manner of addressing a golf ball to be propelled in a direction perpendicular to the centerline of said base, and when the head of said golf club is seated on the flat surface of the base in contact with the means for contacting the face thereof.

It is, therefor, a general object of the present invention to provide apparatus for indicating the relative face alignment of golf clubs.

A further object of the present invention is to provide apparatus for indicating the face alignment of golf clubs which is of simple design and operation.

Yet a further object of the present invention is the provision of apparatus for quickly indicating the relative face alignment of golf clubs which may be used to insure the selection of a set thereof having the desired face alignment.

Still a further object of the present invention is to provide apparatus for indicating the relative face alignment of woods with respect to the shafts thereof when held in the normal position for addressing a golf ball.

Another object of the present invention is to provide apparatus for indicating the relative face alignment of irons when held by an individual in the normal position for addressing a golf ball.

Other and further objects, features and advantages of the invention will be apparent from the following detailed description taken in conjunction with the accompanying drawings.

DESCRIPTION OF THE PREFERRED EMBODIMENTS

Figure 1:
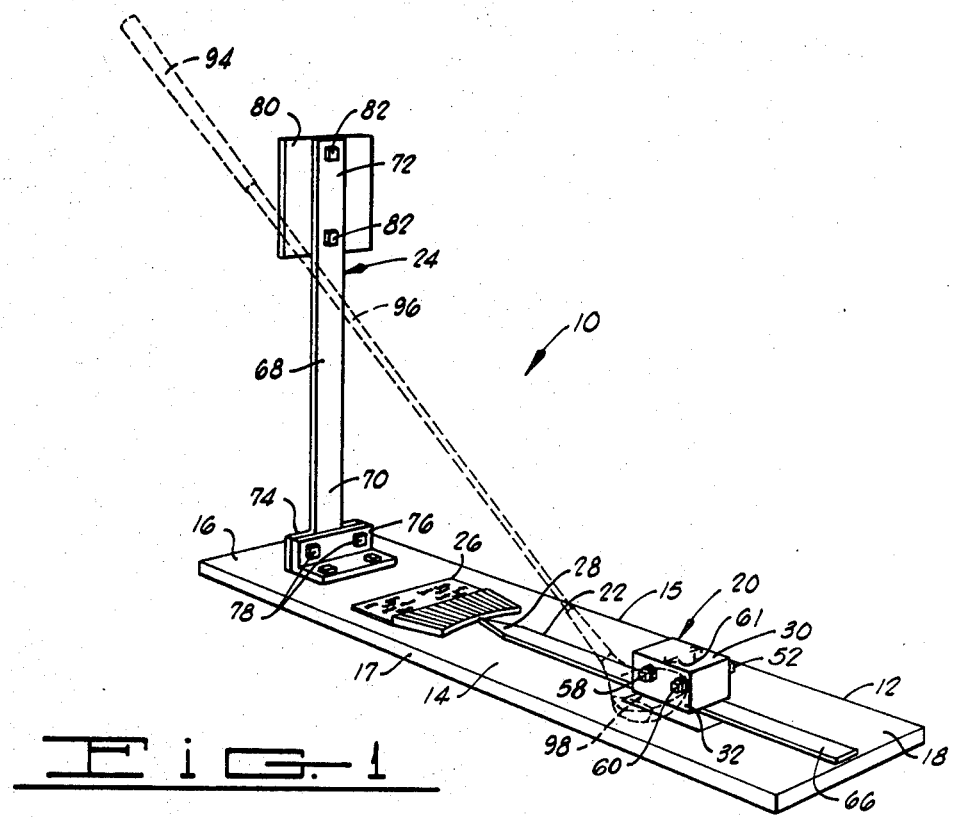
FIG. 1 is a view of the apparatus of the present invention in perspective.
Figure 2:
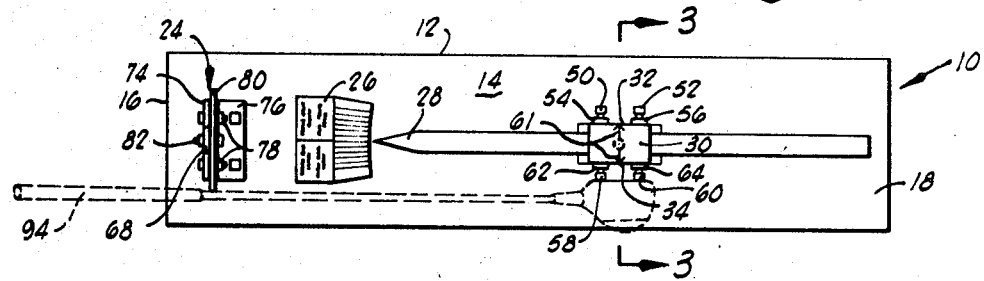
FIG. 2 is a top view of the apparatus of FIG. 1.

Referring particularly to FIGS. 1 and 2, the apparatus of the present invention is generally designated by the numeral 10. The apparatus 10 basically comprises an elongated base 12 having a rectangular shaped flat top surface 14, and having a forward end 16 and a rearward end 18. The base 12 may be formed of wood, metal, or other suitable material. Means for contacting the face of the head of a golf club when the head is seated on the surface 14 of the base 12, generally designated by the numeral 20, are provided. The face-contacting means 20 are pivotally attached to the base 12 a a point near the end 18 thereof midway between the parallel sides 15 and 17 thereof. An indicator arm 22 is attached to the club head face contact means 20 and an upstanding guide member 24 is removably attached to the base 12 at a point near the end 16 thereof midway between the sides 15 and 17. An indicator scale 26 is attached to the surface 14 of the base 12 and is positioned midway between the sides 15 and 17 thereof near the end 28 of the indicator arm 22.

Figure 3:
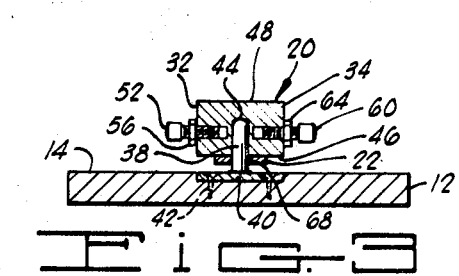
FIG. 3 is a cross-sectional view taken along line 3—3 of FIG. 2.

Referring now to FIGS. 1 through 3, the club head face contact means 20 comprises a rectangular block 30 having a pair of parallel sides 32 and 34. A vertically upstanding post 38 is attached to a plate 40 and the plate 40 is in turn attached to the surface 14 of the base 12 in a convenient manner such as by a plurality of bolts or screws 42. The block 30 includes a bore 44 extending from the bottom face 46 thereof vertically upward towards the top face 48 thereof. The bore 44 is positioned at a point midway between the sides 32 and 34 of the block 30 and extends in a direction parallel thereto. The bore 44 is of a diameter slightly larger than the diameter of the post 38, and the block 30 is positioned on the post 38 with the post 38 extending within the bore 44 thereof. Thus, the block 30 is pivotally secured on the post 38 with the parallel sides 32 and 34 thereof positioned at right angles to the surface 14 of the base 12.

A pair of face contact members 50 and 52 are threadedly secured in a pair of bores (not shown) disposed in the side 32 of the block 30. The members 50 and 52 may be conventional threaded bolts having conventional locknuts 54 and 56, respectively, threaded thereon. The members 50 and 52 are positioned a distance apart with the aces thereof lying in a plane parallel to the surface 14 of the base 12. As will be understood, the upstanding post 38, the block 30 and the members 50 and 52 are of a size and positioned so that the members 50 and 52 contact the face of the head of a conventional right-hand golf club when the head thereof is seated adjacent thereto on the surface 14 of the base 12. A pair of left-hand golf club face contact members 58 and 60 having locknuts 62 and 64, respectively, threaded thereon are threadedly secured in a pair of bores disposed in the side 34 of the block 30 in a like manner as the members 50 and 52. A pair of arrows 61 are engraved or otherwise formed on the top face 48 of the block 30. The arrows 61 are positioned opposite one another on a line perpendicular to the sides 32 and 34 of block 30, midway between the right-hand face contact members 50 and 52, and the left-hand face contact members 58 and 60, respectively.

An indicator arm 22, which may be an elongated flat bar, is provided having a forward end 28 formed into a point and a rearward end 66. The indicator arm 22 is attached to the bottom surface 46 of the block 30 at a point approximately midway along the length of the indicator arm 22. The indicator arm 22 includes a bore 68 (FIG. 3) adjacent to the bore 44 of the block 30 through which the post 38 extends, and the arm 22 is positioned with the centerline thereof parallel to the midway between the sides 32 and 34 of the block 30.

The upstanding shaft guidemember 24 may be comprised of an elongated flat bar 68 having a bottom end 70 and a top end 72. A crossmember 74 is attached to the bottom end 70 of the bar 68 in a convenient manner such as by welding, positioned on a line perpendicular to the centerline of the bar 68. The crossmember 74 includes a pair of bores (not shown) near the ends thereof. An angle-shaped support member 76, which may be a short piece of angle iron, includes a pair of bores complimentary to the bores disposed in the crossmember 74, and a pair of bolts 78 are extended therethrough to clamp the crossmember 74 to the support member 76. The support member 76 is in turn bolted to the surface 14 of the base 12 at a point near the end 16 thereof, midway between the sides 15 and 17 of the base member 12. The bar 68 is thus positioned so that the centerline thereof intersects the centerline of the base 12. A member 80, having parallel vertical sides which may be a length of flat plate, is attached to the bar 68 at the top end 72 thereof in a convenient manner such as by a pair of bolts 82. The plate 80 is positioned with a vertical centerline thereof coinciding with the vertical centerline of the bar 68 and is of a predetermined width which will be discussed further hereinbelow.

Figure 4:
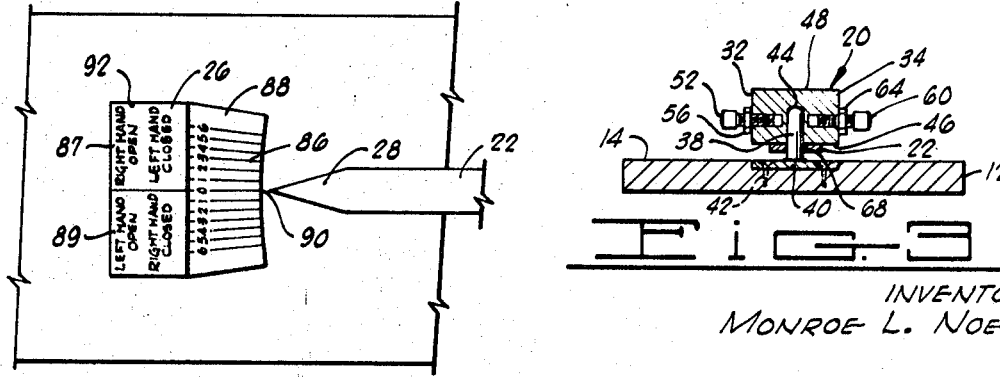
FIG. 4 is an enlarged view of a portion of the apparatus shown in FIGS. 1 and 2.

Referring now to FIG. 4 the indicator scale 26 is illustrated in detail. The indicator scale 26 may be formed of a flat piece of metal and attached convenient the surface 14 of the base 12 in a convenient manner. The indicator scale 26 is positioned with the centerline thereof coinciding with the centerline of the base 12, at a point near the pointed end 28 of the indicator arm 22. A plurality of graduations 86 are engraved or otherwise formed on the rearward end 88 of the scale 26. The central graduation 90 coincides with the centerline of the base 12 and is designated by the number 0. The equally spaced graduations 86 on either side of the graduation 90 are numbered beginning with the graduation closest to the graduation 90 and increasing consecutively. The graduations 86 are spaced apart a distance equal to a 1° rotation of the indicator arm 22. The words "Right Hand Open—Left Hand Closed" are engraved or otherwise formed on forward end 92 of the indicator scale 26 above the graduations 86 on the side 87 thereof, and the words "Left Hand Open—Right Hand Closed" are engraved on the forward end 92 of the indicator scale 26 above the graduations 86 on the side 89 thereof.

OPERATION

In operation of the apparatus 10, for indicating the face alignment of a wood with respect to the shaft thereof, a wood 94 is held in the normal manner of addressing a golf ball with the shaft 96 thereof adjacent to one of the vertical sides of the plate 80 of the shaft guide member 24, and with the head 98 thereof seated on the surface 14 of the base 12 in contact with the face contacting means 20. The approximate center of the head 98 is positioned adjacent to one of the arrows 61 on the block 30. As will be understood, a right-hand golf club is placed on the right-hand side of the guide member 24 and the right-hand side of the face-contacting means 20. A left-hand golf club is positioned on the left-hand side of the apparatus 10 in a like manner. The plate 80 is of a width with respect to the face contact members 50, 52, 58, and 60 so that the shaft of a conventional wood will be positioned parallel with the center line of the base 12 when held as described above. The face contact members 50, 52, 58 and 60 may be adjusted inwardly or outwardly by loosening the locknuts associated therewith and rotating the members in the appropriate direction. The face contact members 50 and 52 are adjusted so that the outward ends thereof lie in a vertical plane parallel to the centerline of the indicator arm 22, and a distance from the centerline of the base 12 so that the shaft of a conventional wood will be positioned parallel thereto when held in the position described above. The members 58 and 60 are adjusted in the same manner as the members 50 and 52.

When the face-contacting members 50 and 52 of the means 20 come into contact with the face of the wood 94, the block 30 and indicator arm 22 will be pivoted horizontally about the upstanding post 38 thereby causing the indicator arm 22 to be moved to a position such that the centerline thereof is parallel to the face of the head 98 of the wood 94.

Thus, the relative deviation of the face of the wood 94 with respect to the shaft 96 thereof, when the wood 94 is held in the normal position for addressing a golf ball, will be indicated on the indicator scale 26 by the pointed end 28 of the indicator arm 22. That is, the relative alignment of the face of the wood 94 with a line parallel to a vertical plane passing through the shaft 96 thereof will be shown in degrees open or degrees closed.

In operation of the apparatus 10 for indicating the face alignment of an iron, the shaft guide member 24 may be removed from the base 12 by removing the bolts 78 from the support member 76 and the crossmember 74 thereof, or the apparatus 10 may simply be turned around so that the individual holding the iron is positioned at the end 18 of the base 12 away from the wood shaft guide member 24. The iron is then held in the normal position for addressing a golf ball with the head thereof seated on the base 12 in contact with the face contact means 20 in the same manner as described above. As will be understood, the iron is held in the manner which assumes that a golf ball is to be propelled in a direction perpendicular to the centerline of the base 12. The face alignment of the iron will be indicated on the indicator scale in the same manner as described above.

Thus, it may be seen that the present invention may be used to quickly and simply determine the relative face alignment of a wood with respect to the shaft thereof when held in the normal position for addressing a golf ball. Consequently, a set of woods suitable for use by an individual having a particular type of swing may be selected. Further more, the apparatus of the present invention may be used to determine the face alignment of irons when held by an individual in his normal manner of addressing a golf ball, and a set of irons suitable for the individual selected accordingly.

The present invention therefore is well adapted to carry out the object and attain the ends and advantages mentioned as well as those inherent therein. While presently preferred embodiments have been given for the purpose of this disclosure, numerous changes in construction and arrangement of parts will be apparent to those skilled in the art.

What is claimed is:

1. Apparatus for indicating the face alignment of right-handed and left-handed golf clubs with respect to the golf club shaft which comprises:
   an elongated base having a flat surface and an upstanding post at one end thereof;
   a block having a pair of opposite parallel sides, the block being pivotally attached to the post for pivotal movement in a plane parallel to the flat surface of the base;
   a pair of face contact members connected to each parallel side of the block, each pair of face contact members positioned a distance apart and lying in a plane parallel to the flat surface of the base, and each pair of face contact members contacting the face of a golf club, in one position of the golf club;
   an indicator arm attached to the block, the movement of the indicator arm being responsive to the pivotal movement of the block;
   an upstanding shaft guide member secured to the base;
   a member having vertical sides secured to the upstanding shaft guide, one of the vertical sides being positioned to engage a portion of the golf club shaft of a right-hand golf club when the head of the golf club is seated on the base and one pair of face contact members engage the face of the golf club such that the pivotal movement of the block and the indicator arm attached thereto indicates the relative alignment of the face of the golf club with the shaft of the golf club, the other vertical side being positioned to engage a portion of the golf club shaft of a left-hand golf club when the head of the golf club is seated on the base and the other pair of face contact members engage the face of the golf clubs such that the pivotal movement of the block and the indicator arm attached thereto indicates the relative alignment of the face of the golf club with the shaft of the golf club;
   a graduated indicator scale attached to the base and positioned with respect to the indicator arm to indicate the relative alignment of the face of the golf club with respect to the shaft of the golf club when said golf club face engages one pair of face contact members and the golf club shaft engages one of the vertical sides of said member, the scale being graduated in one direction to indicate the relative alignment of right-handed golf clubs and graduated in the opposite direction to indicate the relative alignment of left-handed golf clubs.

2. The apparatus of claim 1 wherein the block is further characterized to include: a pair of threaded bores formed in each parallel side of said block; and wherein each threaded member is further defined as being adjustingly and threadedly secured in one of the threaded bores.

3. The apparatus of claim 1 wherein said graduated indicator scale is graduated in degrees of rotation of said block from the centerline of said base.

* * * * *